United States Patent
Moser et al.

(10) Patent No.: US 8,096,158 B2
(45) Date of Patent: Jan. 17, 2012

(54) SAMPLING APPARATUS AND METHOD

(75) Inventors: Friedrich Moser, Hellmonsödt (AT); Roland Gatterbauer, Linz (AT); Jürgen Schiefer, Linz (AT); Werner Rab, Hofkirchen (AT)

(73) Assignee: Siemens Vai Metals Technologies GmbH (AT)

( * ) Notice: Subject to any disclaimer, the term of this patent is extended or adjusted under 35 U.S.C. 154(b) by 1063 days.

(21) Appl. No.: 11/912,071

(22) PCT Filed: Mar. 31, 2006

(86) PCT No.: PCT/EP2006/002933
§ 371 (c)(1),
(2), (4) Date: Dec. 18, 2007

(87) PCT Pub. No.: WO2006/111259
PCT Pub. Date: Oct. 26, 2006

(65) Prior Publication Data
US 2008/0190258 A1    Aug. 14, 2008

(30) Foreign Application Priority Data
Apr. 21, 2005 (AT) ................... A 673/2005

(51) Int. Cl.
*B21B 1/00* (2006.01)
*B21D 3/12* (2006.01)
(52) U.S. Cl. .................... 72/183; 72/203
(58) Field of Classification Search ........ 72/129, 72/148, 183, 203, 252, 146, 250; 83/649; 242/527
See application file for complete search history.

(56) References Cited

U.S. PATENT DOCUMENTS

| 4,344,605 A | 8/1982 | Ganseuer et al. ............ 266/48 |
| 4,549,700 A * | 10/1985 | Ganseuer ................... 242/527 |
| 6,220,070 B1 * | 4/2001 | Drigani et al. ............... 72/203 |
| 7,401,485 B2 * | 7/2008 | Peter et al. ................... 72/148 |

FOREIGN PATENT DOCUMENTS

| DE | 28 15 969 | 10/1979 |
| EP | 0 044 923 | 2/1982 |
| EP | 0 497 182 | 5/1992 |
| EP | 0 761 362 | 3/1997 |

OTHER PUBLICATIONS

PCT International Search Report & Written Opinion dated Jul. 26, 2006 issued in corresponding PCT International Patent Appln. PCT/EP2006/002933.

* cited by examiner

*Primary Examiner* — Debra Sullivan
(74) *Attorney, Agent, or Firm* — Ostrolenk Faber LLP

(57) ABSTRACT

The invention relates to an apparatus and a method for cropping the ends of or for separating test pieces from rolled strip wound into bundles. An apparatus is disclosed which, by means of an outwardly pivotable bottom roller (2) and guide devices (5, 6, 7, 8, 13, 14) for guiding the strip end to the shears, also makes it possible to process strips which are thicker or of greater firmness and are wound into bundles (10). Furthermore, a method is specified, which allows a reliable sampling and, if appropriate, inspection of the sample from strips wound into bundles, a closed bundle being obtained again after sampling.

24 Claims, 4 Drawing Sheets

SAMPLING APPARATUS AND METHOD

CROSS REFERENCE TO RELATED APPLICATION

The present application is a 35 U.S.C. §§371 national phase conversion of PCT/EP2006/002933, filed Mar. 31, 2006, which claims priority of Austrian Patent Application No. A 673/2005, filed Apr. 21, 2005, the disclosure of which has been incorporated herein by reference. The PCT International Application was published in the German language.

FIELD OF THE INVENTION

The invention relates to an apparatus and a method for cropping the ends of or for separating test pieces from rolled strip wound into bundles, comprising shears, a first and a second bottom roller, of which the axes arranged in parallel form an essentially horizontal plane, for the reception of a bundle with a horizontally oriented bundle axis, the spacing of the axes being smaller than the smallest bundle diameter, and at least one pressure roller of adjustable position.

BACKGROUND OF THE INVENTION

In the production of rolled strips, it is customary to wind these, uncut, into bundles and provide them for further processing. In this case, there is often the need to inspect or to test the strips wound into bundles, that is to say to extract test pieces from the bundles.

A multiplicity of apparatuses for the sampling of strips wound into bundles are known from the prior art. Apparatuses which have proved appropriate in this context are those which extract a sample from the outer turns of the bundle.

For example, an apparatus for the sampling of strip wound into a bundle may be gathered from EP 0044923 B1. In this, the bundle lies on two bearing rollers. The outer turn is delivered in a vertical position to shears by a bundle opener and guide devices. The disadvantage of this, above all, is that the free strip length which the strip covers from the rear bearing roller, as seen in the direction of rotation, as far as the guide devices or the shears is very long, so that sufficient guidance of the free strip end is not reliably afforded. Particularly where thicker and firm strips are concerned, this may lead to faults or make sampling more difficult. Nor is inspection readily possible because of the position of the cut sample.

SUMMARY OF THE INVENTION

Proceeding from the prior art, an object of the invention is to make available an apparatus and a method which allow a reliable sampling or cropping of strips wound into bundles, while a reliable solution is to be offered even in the case of strips of greater firmness or thickness.

The object is achieved according to the apparatus of the invention, and, according to the method of the invention.

The apparatus according to the invention provides two bottom rollers, one bottom roller being of adjustable design. Bottom rollers serve essentially for the mounting of bundles which are to be supported, mounted rotatably with their surface area, on the bottom rollers. In this case, at least one of the bottom rollers is designed to be driven, so that the bundle is mounted rotatably about its axis. The strip end always has to be fixed by one of the rollers, in order to prevent the bundle from springing open undesirably. So that a sample can be extracted, it is necessary to open the bundle and to draw off a piece of the strip end from the bundle. In this case, particularly where strips of greater firmness or even thick strips are concerned, considerable deformation work has to be performed, since the drawn-off strip end has to be bent up or approximately straightened, so that it can be delivered to shears or an inspection device. The deformation to be performed is the higher, the narrower the bending radius is. It is therefore advantageous to increase the free strip length between a bearing point of the bundle and the bundle opener, but in this case nevertheless always to allow a reliable guidance of the bundle and of the strip end at any time point during sampling. At the same time, it is possible to carry out an inspection of the sample immediately after sampling.

On account of the increased free strip length, between the remaining bottom roller and the pressure roller, the local deformation of the strip end is lower, without the threat of a risk of a bundle springing open or being loosened, in which case, for example, the outer turns could come loose. At the same time, however, even thick strips or even those with high deformation resistance can be reliably opened in a simple way and the strip end drawn off reliably from the bundle and samples taken. On account of the advantageous guidance of the bundle between at least two rollers, a stable position of the bundle is also always afforded, this also being necessary for the rotary positioning of the bundle. It is also conceivable, however, to provide more than one pressure roller, in order to guide the bundle in an even more stable way.

In solutions with two fixedly installed bottom rollers, the roller spacing must be selected such that, even in the case of the smallest bundle diameter to be expected, a reliable mounting of the bundle is still afforded. In view of the technically customary minimum and maximum bundle diameters, an adverse compromise always has to be made in the choice of the spacing of the fixedly installed bottom rollers, so that one roller spacing has to be used for all bundle diameters. This disadvantage is eliminated by the apparatus according to the invention, particularly by the pressure roller of adjustable position.

According to an advantageous embodiment of the apparatus according to the invention, the arc segment between the lines of contact of the first bottom roller and of the pressure roller on the bundle surface area is designed to be greater than 90° C., in particular 120° C. This advantageous embodiment affords a particularly stable guidance of the bundle and makes it possible to draw off the strip end in a simpler way.

By the remaining bottom roller being combined with two pressure rollers of adjustable position, a further advantageous solution is found, so that the bundle is held on the circumference by three rollers, while an advantageous division by an arc angle in each case between the bottom roller and the pressure rollers of about 120° can be selected. However, this arrangement may also be adapted according to the requirements and to the situation as regards position. It is also conceivable to vary the arc angles between the pressure roller or pressure rollers of adjustable position in relation to the bottom roller, and, for example, the different geometry due to a changed bundle diameter can be taken into account.

According to a further possible embodiment of the apparatus according to the invention, an opening blade for opening the bundle is provided. With closed bundles, it may happen under certain circumstances, particularly in the case of a deformed or damaged strip end, that the strip end cannot readily be detached from the bundle. However, using an opening blade, the strip end can be detached reliably even in such instances.

A particularly advantageous embodiment of the apparatus according to the invention is achieved in that the blade is adjustable, the axis of rotation of the blade coinciding with the axis of rotation of the pressure roller. Owing to the adjustability, the blade can be positioned optimally, so that the bundle is opened reliably and the next inner turns of the bundle are not in this case damaged. At the same time, it has proved to be a simple and advantageous solution to combine the axis, about which the adjustment of the blade takes place, with the axis of the pressure roller. A simpler and stable mounting of the blade, utilizing the high-mass carrier structure of the pressure roller, is consequently additionally achieved.

A preferred embodiment of the apparatus according to the invention provides a pivotable guide device which has at least one guide roller for guiding the strip end to the shears and for displacing the strip end. On account of the weight-related high-mass design of apparatuses for the processing of bundles, there is a minimum structural spacing between the bundle and the shears, so that devices have to be provided in order to guide the strip end from the bundle to the shears. By a pivotable guide device with at least one guide roller being used, the loose strip end then drawn off can be delivered to the shears, the strip end mostly being deformed and guided in terms of its position, since, after being drawn off, it is, of course, still curved or else deformed unevenly. Thus, by means of the guide device, strip ends which have become stuck or even damage caused by the collision of a bent strip end with part of the shears can be reliably avoided.

An alternative embodiment of the apparatus according to the invention provides for the guide device to comprise an adjustable guide plate for guiding the strip end. In order to ensure reliable guidance, even in the case of thinner strips, it is necessary to provide corresponding lead devices, in order thereby to avoid reliably strips which have been caught or even damage as a result of this. In the case of thin or softer strips, the sag under their own weight can in this case be absorbed and the strip end delivered to the guide device.

A further alternative embodiment of the apparatus according to the invention comprises an adjustable guide element for guiding the strip end on its top side. The guide element constitutes, particularly in conjunction with the guide device, a highly robust apparatus for guiding the strip end. By combination with rollers, a low-friction guidance of the strip in the case of both thick and thin strips becomes possible.

According to a further advantageous embodiment of the apparatus according to the invention, at least one driving roller of adjustable position is provided, which, together with a guide roller, forms a pair of driving rollers, with axes lying essentially parallel to one another, for transporting or fixing the strip end. In order to ensure an even better guidance of the strip end, a driving roller is provided so that the strip end can be guided by means of the driver function. In the case of strips of greater firmness, very considerable elastic recoils may occur, which, in addition to a fault during sampling, may cause even very considerable damage on account of the high acting forces or may also be a risk to the operating personnel. Owing to the guidance between the guide roller and the driver roller, on the one hand, a recoil is ruled out and clamping between the rollers is possible. Furthermore, the pair of rollers, in a corresponding way to a driver, can also control the guidance or feed of the strip end into the shears very accurately, so that sampling is possible in an exact position.

According to a further possible embodiment of the apparatus according to the invention, the guide roller and/or the driving roller are adjustable in position in a direction perpendicular to the plane formed from their axes of rotation. In this case, the changed geometric situation due to the axial offset may be utilized in order to change the curvature of the strip end. Since the plane is then tilted in relation to the strip end, a desired deformation can be applied to the strip end and at the same time its curvature can be influenced. The strip end can thus be prepared for sampling, so that the cut in the shears takes place without difficulty and a test piece already prepared for inspection or for further testing is available.

An advantageous embodiment of the apparatus according to the invention provides for the guide roller and/or the driving roller to be adjustable in position in the plane formed from their axes of rotation. It is consequently possible, by changing the gap between the rollers, to achieve an influencing of the lateral position of the strip end. On account of the tilting of one or of both rollers, the gap between the rollers and consequently the force from the strip end can be varied, so that a steering effect, which is directed approximately parallel to the roller axes, can be achieved. By virtue of this steering effect, the strip end can be guided even more effectively to or into the shears.

The combination of the pivoting function in the plane formed from the axes of the guide roller and of the driving roller and perpendicularly to this achieves an even better influencing of the shape and position of the strip end.

According to an advantageous embodiment of the apparatus according to the invention, the guide roller and/or the driving roller have/has a rotary drive. By virtue of the drive, the strip end can be conveyed in a defined way and a tensile stress can be applied in the strip end. Furthermore, the strip end can be introduced and positioned exactly in the shears.

According to a possible embodiment of the apparatus according to the invention, the driving roller is mounted pivotably about an axis, the axis being fixed to the guide device. The combination of the driving roller and of its mounting on the guide device affords a particularly simple embodiment which is distinguished, above all, by its robustness and which makes a complicated tracking in the positioning of the rollers unnecessary. This is also followed by a substantially more cost-effective and simpler automation for actuating the rollers.

An advantageous embodiment of the apparatus according to the invention provides for the guide roller to be adjustable in such a way that the strip end is pressed against the pressure roller fixed in position and lifted off from the bundle, and in this case a curvature corresponding essentially to the curvature of the outer turning of the bundle can be set. On account of the positionability of the pressure roller, the latter can be brought into a defined position and also be locked in this position, that is to say fixed in terms of its position. The pressure roller may be utilized as a stay for the deformation of the strip end. In order to set a deformation, the strip end is pressed by means of the guide roller against the pressure roller acting as a stop, and in this case a defined deformation of the strip end is brought about. This is usually carried out in such a way as to impart to the strip a curvature which corresponds essentially to the curvature of an outer turn of the bundle. Such a measure is of major importance, since a bundle which is not closed or else a projecting strip end may lead to considerably disadvantages in bundle handling, that is to say during further processing.

According to an alternative embodiment of the apparatus according to the invention, a stop on the shears is provided as a stay for curving the strip end. Particularly in the case of very firm, but also thick strips, it has proved to be an effective solution for varying the curvature of the strip end, using the guide device and a high-mass stop which is arranged on the shears or in the region of the latter.

The method according to the invention for cropping the ends of or for separating test pieces from rolled strip wound into bundles affords the possibility, on account of the lowerable bottom roller, of being able to process even strips of greater firmness or thickness or even having a combination of these properties, an efficient and reliable method being provided. The method in this case starts from a closed bundle and ends again with a closed bundle and with a sample which can be delivered for further inspection or testing. On account of the lowerable bottom roller, the spacing of the contact points between the first bottom roller and the pressure roller is increased, so that the free length between the bottom roller and the pressure roller becomes markedly greater than would be the case in a mounting on two bottom rollers. On account of the greater free length, which constitutes the bending length over which the strip end is bent during opening, even strips which are difficult to deform can in this case be drawn off from the bundle, but at the same time a very good guidance of the strip end and of the bundle is always ensured. By virtue of the method, the product mix, which usually has to be processed by means of one procedure on one apparatus, can be markedly extended, so that no special methods or apparatuses are necessary for bundles which are more difficult to deform. The inspection of the strip or of the separated test piece can advantageously take place directly.

An advantageous embodiment of the method according to the invention provides for the curvature of the strip end to be varied by means of a guide device and for the strip end to be essentially straightened. By virtue of the existing curvature of the outer turns on the bundle, it is difficult to guide the strip end to the shears. Furthermore, it often happens that the strip end, from which a sample is to be taken, does not bear closely against the bundle, but is deformed in an undefined way, for example because of a fault in the handling of the bundle or in a previous processing step. Moreover, it is advantageous for processing in the shears and for the further testing of the separated piece if the latter has no or only a very slight curvature. Owing to the combined function of the guide device which is also used at the same time for deforming the strip end, a direct feed of the strip end to the shears can be achieved, so that there is no need for an intermediate step.

According to an alternative embodiment of the method according to the invention, the strip end is guided in the guide device and is delivered to the shears as a result of the pivoting of the guide device. The pivotable guide device makes it possible to position the strip end in such a way that an optimal cutting position for the shears is ensured. Furthermore, if appropriate, elastic deformations can also be compensated or at least greatly reduced in a desired way.

According to an advantageous embodiment of the method according to the invention, the guide device has a driver function, so that the strip end is guided or conveyed to the shears. It has proved advantageous, in the case of softer or thinner materials, to ensure an improved feed of the strip end to the shears by applying a pull to the strip end. On account of the driver action, the strip end is guided, so that the latter can also be positioned substantially more accurately in the shears than would be possible only as a result of a rotation of the bundle. The driver action of the guide device likewise ensures that even strip ends of greater firmness are guided reliably and therefore damage due to elastic stretching which could relax spontaneously when the guide is released is reliably avoided.

According to a suitable embodiment of the method according to the invention, after cutting, the strip end is wound up again to an extent such that an open length of the strip end remains which corresponds essentially to the length of the guide device. So that the guide device can be fully utilized for deforming the strip end after cutting and before winding up, the strip end is wound onto the bundle again only to an extent such that the remaining strip end can be deformed by the guide device before winding up. On account of the remaining length, it is possible to adapt the strip end largely to the curvature of the bundle, so that, after sampling, a closed bundle is obtained again.

According to an advantageous embodiment of the method according to the invention, a surface inspection takes place directly on the cut-off strip end. In view of the possibility of influencing the shape of the strip and because of the largely horizontal position of the sample, the latter can be inspected immediately after the sample cut, turning devices for the test piece also advantageously being provided so that the strip can be inspected on both sides.

According to an advantageous embodiment of the method according to the invention, after sampling, the strip end is raised as a result of the pivoting of the guide device and clamped between the guide roller and driving roller, and, immediately thereafter, the second bottom roller is raised. A strip pull can be applied via the guide roller and driving roller and/or by turning the bundle back. By the strip end being raised and by clamping in the region of the lower bottom roller, the strip end is laid firmly onto the bundle. Thereafter, the bottom roller is raised and is pressed firmly against the bundle, so that the bundle then lies on both bottom rollers again. In order to ensure that the strip end comes to bear firmly before the bottom roller is raised, the strip end can be clamped by means of the guide and driving roller. Damage to the outer turns is effectively prevented in this way.

In a further advantageous embodiment of the method according to the invention, the strip end, before being wound up, is curved by means of the guide roller around the pressure roller lifted off from the bundle and fixed in position, so that in this case a curvature, in particular corresponding to the curvature of the outer turn of the bundle, can be set. Since the strip end has been deformed and largely straightened for sampling and for the cut in the shears, a deformation of the strip end is necessary, since otherwise, particularly where strips of greater firmness are concerned, the outer turns would not come to bear. As a result of the directed deformation by means of the guide roller which presses the strip end against the pressure roller, a curvature can be applied which corresponds to the curvature of the outer turns of the bundle. What can be ensured by this measure is that the bundle does not have any projecting strip end and further bundle handling can take place according to requirements.

The apparatus according to the invention is illustrated by way of example, but not restrictively, with reference to the figures.

The object is achieved, according to the apparatus of the invention, and, according to the method of the invention

DESCRIPTION OF PREFERRED
EMBODIMENTS OF THE INVENTION

Figure 1:
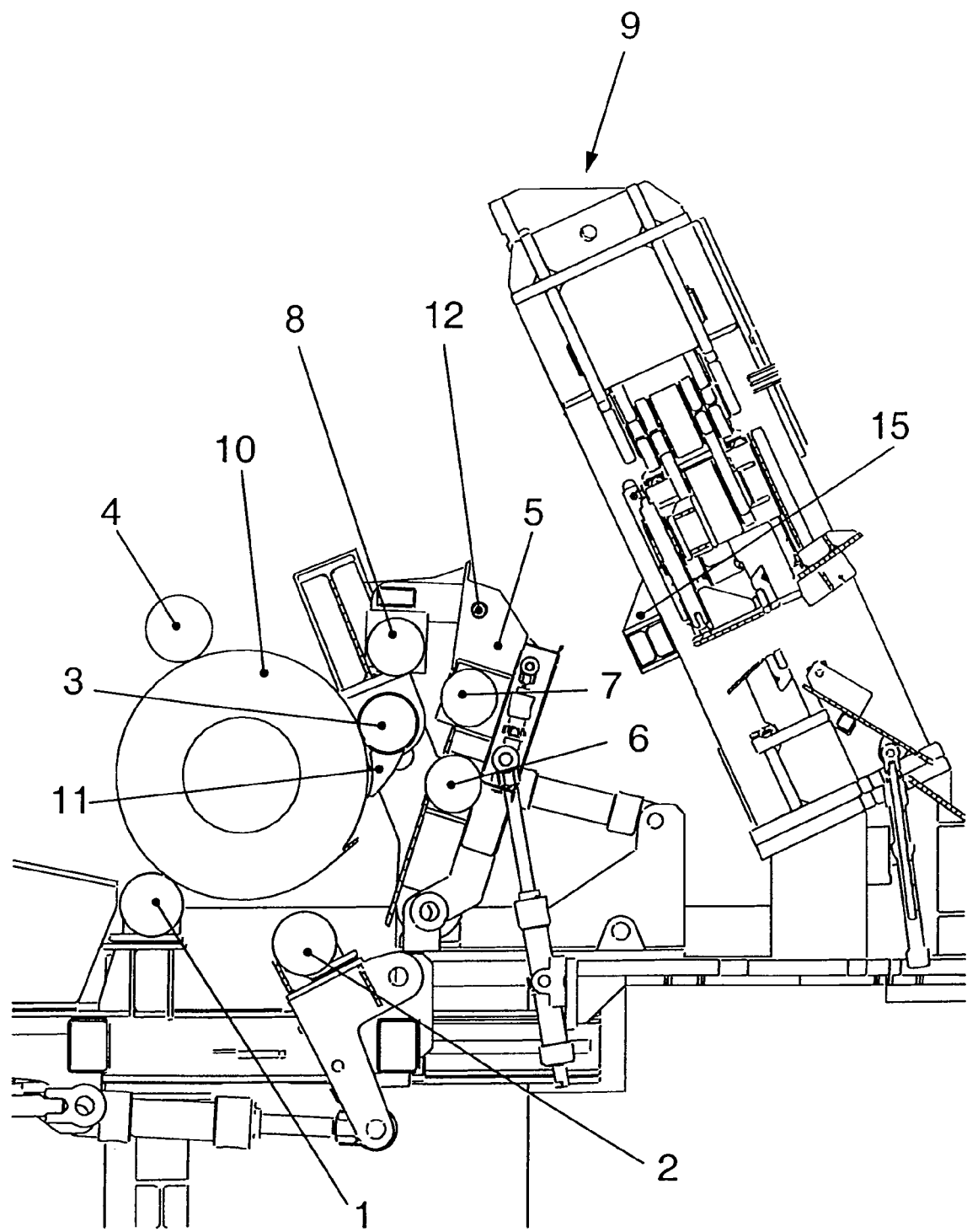
FIG. 1 shows the apparatus according to the invention during unwinding.

The apparatus according to the invention during the unwinding of the strip from the bundle (10) may be gathered from FIG. 1. The unwound strip end is not illustrated in the figures. The situation illustrated in FIG. 1 shows the already lowered bottom roller (2). The bundle (10) rests on the bottom roller (1) and the pivoted-in pressure roller (3). An additional pressure roller (4) may also optionally be provided, so that the bundle (10) is supported on its surface area, in each case approximately an arc angle of 120° between the lines of contact of the rollers on the surface area being advantageous. By virtue of the mounting on the rollers (1, 3, 4), on the one hand, a rotation of the bundle is possible and, on the other hand, the bundle (10) is reliably prevented from springing open. It is also possible to provide more than one additional pressure roller, so that the bundle can additionally be guided on its surface area.

It has proved advantageous to design one or more of the rollers which touch the bundle so as to be drivable in rotation.

By means of the pressure roller (3), an opening blade (11) is also adjusted, so that the strip end can be drawn off from the closed bundle (10). In this case, the curved strip end is pushed into the guide device (5) which has the guide rollers (6, 7) and the driving roller (8). The strip end can then be guided or held between the guide roller (7) and the driving roller (8). On account of the then long free length of the strip end which is fixed between the bottom roller (1) and the rollers (7, 8), the existing curvature can then be effectively varied, even in the case of strips which are of greater firmness or are thick, so that a feed into the shears is possible without difficulty. It is also possible to provide a high-mass stop (15), so that, using the guide device (5), the strip end can be pressed against the stop (15) and its curvature can at the same time be influenced. Furthermore, the stop also provides protection for the shears (9).

Figure 2:
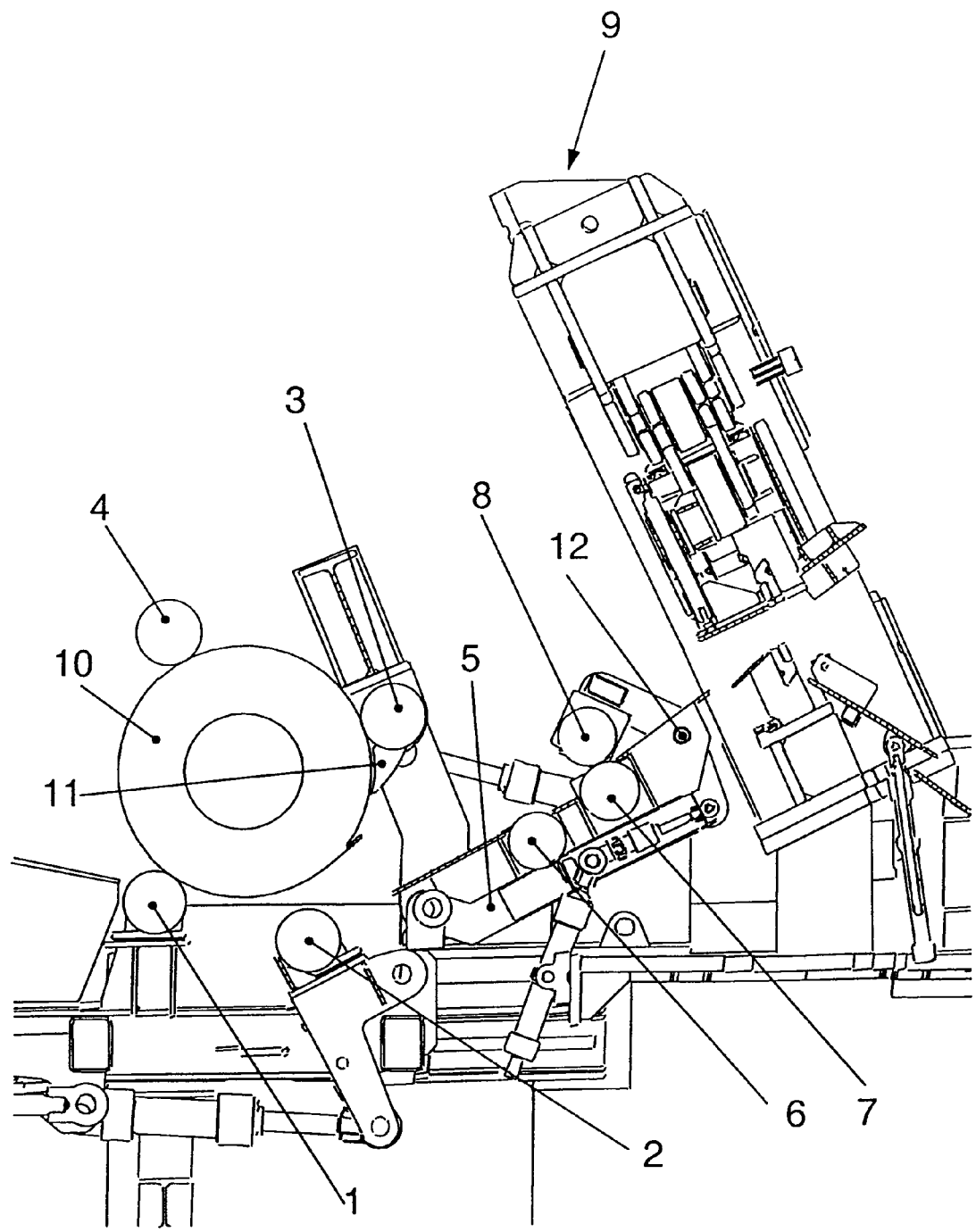
FIG. 2 shows the apparatus according to the invention when the strip end is being threaded into the shears.

FIG. 2 illustrates a next phase in which the strip end has already been tilted and deformed, so that it can be delivered to the shears (9). The reliable guidance ensures that even any elastic recoils cannot occur, since the strip end is guided in each phase. On account of the adjustability of at least one of the rollers (7, 8) in a direction perpendicular to and/or in the plane formed from the two axes of rotation of these rollers, the strip end can also be deformed effectively during delivery to the shears, so that a largely planar and stress-free sample is achieved during sampling. This has advantages, above all, for the cutting and further processing of the sample. The guide roller (7) and the driving roller (8) in this case act as drivers which, in addition to deformation, also make it possible to feed the strip to the shears and position it in the shears.

Figure 3:
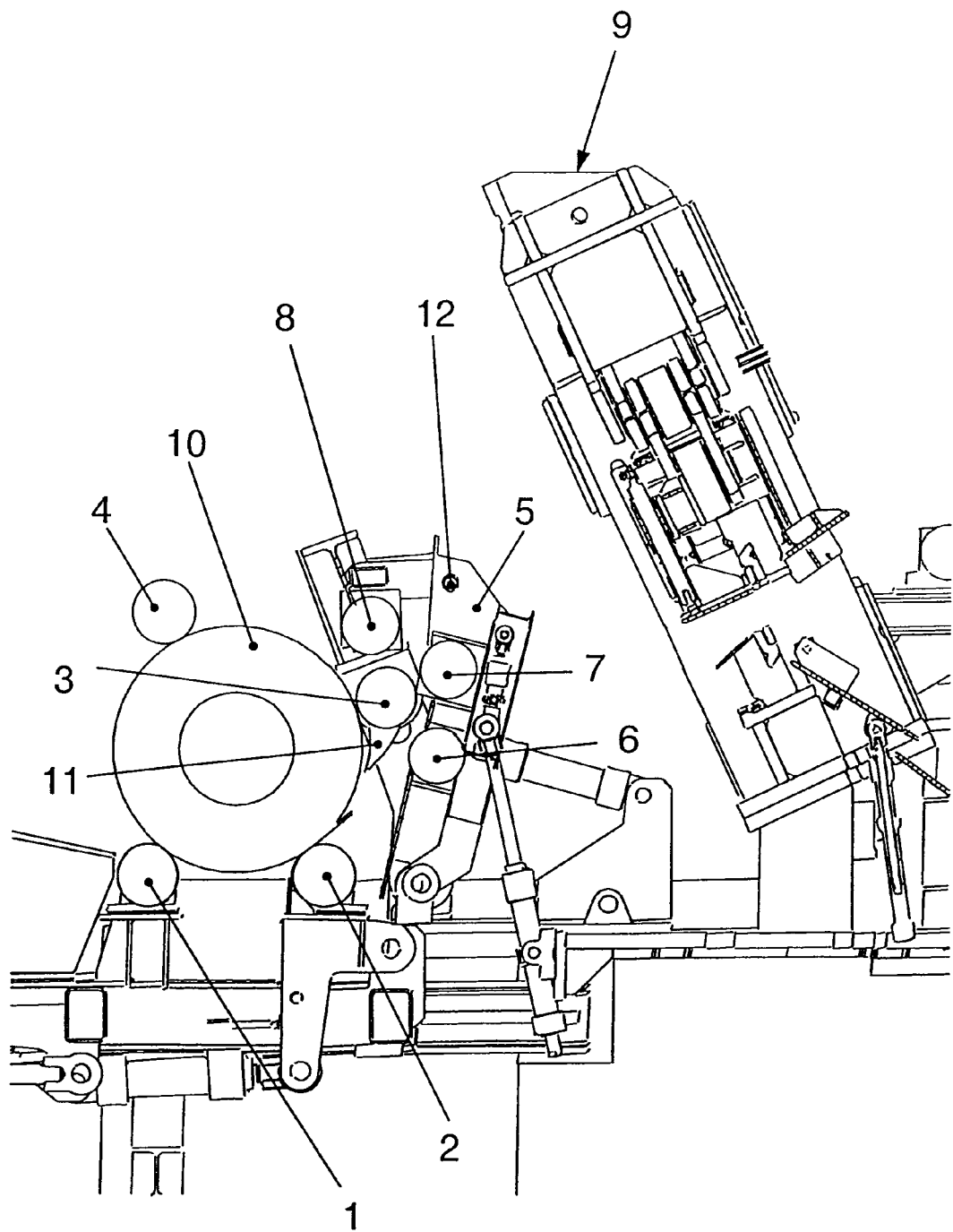
FIG. 3 shows the apparatus according to the invention when the strip end is being wound onto the bundle.

FIG. 3 shows the phases after the cutting of the sample. The strip end is wound up to an extent such that the strip end can be pivoted up by the guide device (5). In this case, the strip can be clamped between the guide roller (7) and the driving roller (8). Before the strip end is swung up, a pull can be applied to the strip end by the guide roller (7) and the driving roller (8) or by the bundle being turned back. The strip end is thereby laid firmly against the bundle in the region of the lowered bottom roller (2). As a result, the bottom roller (2) is raised again and pressed against the bundle surface area, so that the bundle then lies on the two bottom rollers (1, 2). The pressure roller (3), if appropriate also the additional pressure roller (4), is then lifted off from the bundle, and the position of the lifted-off pressure roller (3) is fixed.

The remaining strip end which is held by the driver formed by the guide roller (7) and the driving roller (8) can then be deformed around the pressure roller (3), the driving roller (8) previously being lifted off from the strip end. It is thereby possible to impart a desired curvature to the strip end, so that the strip end, after being wound completely on the bundle, comes to bear closely and forms a closed bundle.

Figure 4:
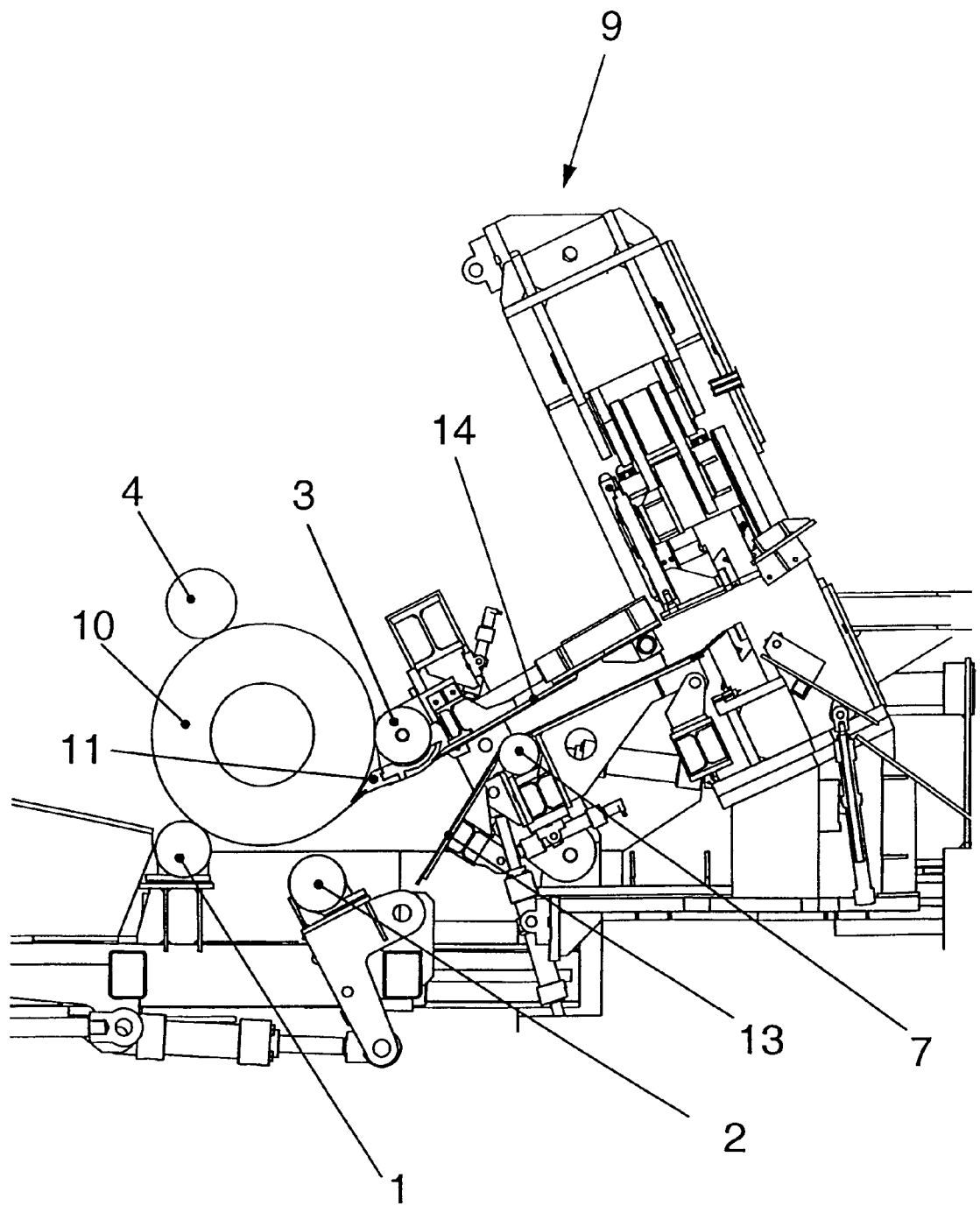
FIG. 4 shows an alternative apparatus according to the invention for feeding the strip end to the shears.

FIG. 4 illustrates an alternative version of the apparatus. In addition to the guide device (5), an adjustable guide plate (13) for guiding the strip end is provided. In this case, as in the case of a funnel which is formed between the plate (13) and the pressure roller (3) or the opening blade (11), the guide plate (14) can improve the feed of the strip end to the guide device (5) and strip ends which have become stuck are avoided.

In a further variant, the strip end is not only guided by the guide device (5) and the opening blade (11), but by an adjustable guide element (14) which guides the strip end on its top side. By the guide device (5) being combined with the adjustable guide plate (13) and with the adjustable guide element (14), a highly robust and reliable funnel-like guide of the strip end is provided, so that a problem-free feed to the shears and consequently a sampling or inspection of the sample can be ensured. The apparatus parts (5, 13, 14) may also be combined with guide rollers (6, 7) and driving rollers (8), in which case these may also be designed to be driven.

The invention claimed is:

1. An apparatus for cropping the ends of or for separating test pieces from rolled strip wound into bundles,
   the appartus comprising:
   shears,
   a first and a second bottom roller having respective axes arranged in parallel and forming an essentially horizontal plane, for the reception of a bundle of rolled strip having a horizontally oriented bundle axis, the spacing of the axes of the bottom rollers being smaller than the smallest bundle diameter,
   a pressure roller which is adjustable in position, the second bottom roller is adjustable in position for lifting off from a surface area of the bundle, the first bottom roller and the pressure roller being configured to support the bundle , so that a first arc segment between lines of contact of the first bottom roller and of the pressure roller on the bundle surface area is greater than a second arc segment between lines of contact of the two bottom rollers, and
   at least the first bottom roller or the pressure roller having a rotary drive.

2. The apparatus as claimed in claim 1, wherein the first arc segment between the lines of contact of the first bottom roller and of the pressure roller on the bundle surface area is greater than 90°.

3. The apparatus as claimed in claim 2, wherein the arc segment is 120°.

4. The apparatus as claimed in claim 1, wherein an opening blade is provided for opening the bundle.

5. The apparatus as claimed in claim 4, wherein the blade is adjustable, the pressure roller having an axis of rotation, and the blade having an axis of rotation of the blade coinciding with the axis of rotation of the pressure roller.

6. The apparatus as claimed in claim 1, further comprising a pivotable guide device, which has at least one guide roller provided for guiding the strip end to the shears and for displacing the strip end.

7. The apparatus as claimed in claim 6, wherein the guide device comprises an adjustable guide plate for guiding the strip end.

8. The apparatus as claimed in claim 6 wherein an adjustable guide element is provided for guiding the strip end on a top side of the strip end.

9. The apparatus as claimed in claim 6, further comprising a driving roller which is adjustable in position and which, together with the guide roller, forms a pair of driving rollers having respective axes of rotation lying essentially parallel to one another, for transporting or fixing the strip end.

10. The apparatus as claimed in claim 9, wherein the guide roller or the driving roller that form the pair of driving rollers is adjustable in position in a direction perpendicular to a plane formed from their axes of rotation, in order to change the curvature of the strip end caused by a respective axial offset of the guide and driving rollers.

11. The apparatus as claimed in claim 9, wherein the guide roller or the driving roller is adjustable in position in a plane formed from their respective axes of rotation, in order to change a gap between the guide roller and the driving roller and to influence a lateral position of the strip end.

12. The apparatus as claimed in claim 9, wherein the guide roller or the driving roller has a rotary drive.

13. The apparatus as claimed in claim 9, wherein the driving roller is mounted pivotably about an axis fixed to the guide device.

14. The apparatus as claimed in claim 9, wherein the guide roller is adjustable in such a way that the strip end is pressed against the pressure roller fixed in position and lifted off from the bundle, and such that a curvature, can be set in the strip end.

15. The apparatus as claimed in claim 14, wherein the curvature of the strip in the strip end is set corresponding to the curvature of the outer turn of the bundle.

16. The apparatus as claimed in claim 9, wherein a stop on the shears is provided as a stay for curving the strip end.

17. A method for cropping the ends of or for separating test pieces from rolled strip wound into bundles, comprising the steps:
   positioning a bundle on a first and second bottom roller, the bottom rollers touching the bundle on a surface area thereof,
   pivoting in of a pressure roller which touches the bundle on its surface area and fixes the bundle in terms of its position,
   lowering the second bottom roller in order to increase spacing of contact points of the first bottom roller and of the pressure roller,
   rotating the bundle in order to open the bundle and deliver a strip end of the bundle to a cutting or inspection device,
   cutting the strip end for sample or the inspection of the sample,
   laying the remaining strip end onto the bundle.

18. The method as claimed in claim 17, further comprising before cutting, varying the curvature of the strip end by means of a guide device, and the strip end is essentially straightened.

19. The method as claimed in claim 18, further comprising guiding the strip end in the guide device and delivering the strip end to a shears for the cutting step by pivoting the guide device.

20. The method as claimed in claim 18 wherein the guide device has a driver function and the method comprises guiding or conveying the strip end to the shears by means of the guide device.

21. The method as claimed in claim 17, wherein after the cutting of the strip end, winding the strip end up again to an extent such that a length of the strip end remains which corresponds essentially to a length of the guide device.

22. The method as claimed in claim 17, wherein inspection comprises surface inspection directly on the cut-off strip.

23. The method as claimed in claim 18, wherein after the sampling or inspection, raising the strip end as a result of pivoting of the guide device, and clamping the strip end between a guide roller and a driving roller of the guide device, and, immediately thereafter, raising the second bottom roller.

24. The method as claimed in claim 18, wherein before laying the strip end onto the bundle, curving the strip end by means of a guide roller of the guide device around the pressure roller fixed in position and lifted off from the bundle, so that the strip end has a curvature corresponding to an outer diameter of the bundle.

* * * * *